Aug. 4, 1936.  A. C. ROUTH  2,049,779

REFRIGERATING PACKAGE

Filed Oct. 30, 1935

INVENTOR.
Almond C. Routh
BY
Hough and Canfield
ATTORNEY.

Patented Aug. 4, 1936

2,049,779

UNITED STATES PATENT OFFICE 2,049,779

REFRIGERATING PACKAGE

Almond C. Routh, Sandusky, Ohio

Application October 30, 1935, Serial No. 47,469

11 Claims. (Cl. 62—91.5)

This invention relates to containers and particularly to refrigerating containers for ice cream and other frozen comestibles.

It is a well known practice to enclose a consumable portion of ice cream or other frozen comestible in a cardboard, paper or other container together with a small quantity of "dry ice" to prevent immediate melting of the comestible. Various heat insulated containers have been proposed in the effort to keep the ice cream or other frozen comestible therein frozen for a sufficient length of time, not only to insure its delivery at the point of domestic consumption in good condition, but to keep it frozen thereafter until served.

Such prior containers, however, have had the serious objection that if the ice cream in the part of the container remote from the dry ice is kept from melting, the ice cream nearer the dry ice will be frozen too hard and solid to be attractive for consumption; or if the ice cream near the dry ice is kept at the right temperature, the more remotely disposed ice cream will melt.

It is therefore an object of this invention to provide an improved refrigerating package for ice cream and other frozen comestibles.

Another object is to provide a refrigerating container of the class referred to adapted to be refrigerated by dry ice, and having improved means for maintaining all parts of the ice cream in the container at substantially the same temperature.

Another object is to provide a refrigerating container of the class referred to having means for enclosing a quantity of dry ice in one compartment and a quantity of comestible frozen material in another compartment in the container, and having improved means for causing all parts of the comestible containing compartment to be kept at substantially the same temperature.

Another object is to provide an improved refrigerating container of the class referred to adapted to be manufactured entirely from one kind of heat insulating material such as corrugated paper board.

Other objects will be apparent to those skilled in the art to which my invention appertains.

My invention is fully disclosed in the following description taken in connection with the accompanying drawing, in which.

Figure 1:
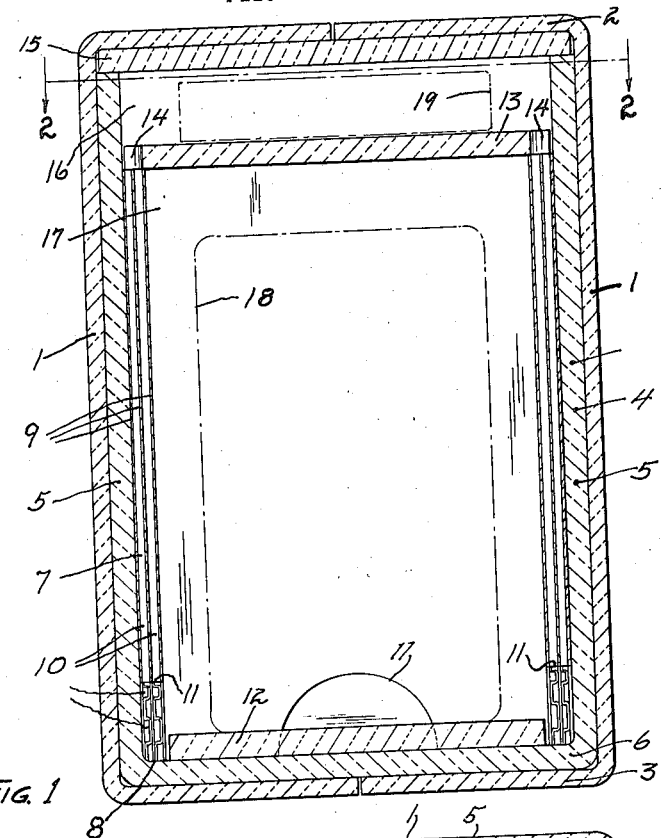
Fig. 1 is a longitudinal sectional view of a container embodying my invention.
Figure 2:
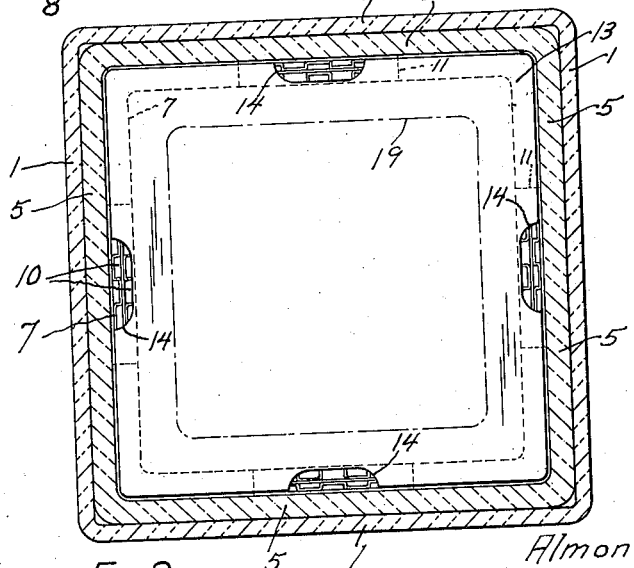
Fig. 2 is a cross-sectional view taken from the plane 2—2 of Fig. 1.

Referring to the drawing, I have shown a container embodying my invention and comprising lateral walls 1—1 and top and bottom walls 2 and 3 constituting the outer wall of the container. The walls 1, 2, and 3 may be made from any suitable heat insulating material, such as corrugated paper board or fibrous material and the structure and material of the outer walls constitute no essential part of the present invention. Preferably, however, the top wall 2 is made so that it may be opened after the manner of an ordinary pasteboard box.

Within the wall 1 is a liner 4 comprising lateral walls 5—5 and a bottom wall 6. The walls 5 and 6 also may be made of any suitable heat insulating material and constitute no essential part of the invention. A tubular liner 7 is telescoped within the walls 5—5, resting at its lower end upon the bottom wall 6 as shown at 8. The liner 7 is preferably made from corrugated paper board with the corrugations running upwardly and downwardly of the container as shown in Fig. 1. Such corrugated paper board as is well known comprises spaced layers of paper 9—9 having therebetween paper in corrugated formation as shown at 10—10. The longitudinally extending corrugations thus provide ducts within the wall of the liner 7 extending from end to end thereof.

At its lower end the liner 7 has a plurality of recesses or notches 11—11 formed in its lower edge. Within the liner 7 and resting upon the bottom wall 6 is a liner wall 12 of heat insulating material.

Resting upon the upper end of the liner 7 is a cover element 13 formed from heat insulating material such as corrugated cardboard or the like having a plurality of notches in its edges as shown at 14—14, four such notches being a suitable number. Preferably the notches 14 are of smaller radial depth than the thickness of the liner 7, so that the recesses 14 are completely covered by the end of the liner 7.

The liner 7 is shorter than the inner wall 5 and a cover 15 of heat insulating material rests upon the upper end of the wall 5.

The cover element 13 thus divides the interior of the container into an upper small compartment 16 and a lower large compartment 17.

In the practice of my invention, the containers may be made complete as illustrated and as described above, and when it is put into use, the upper wall 2 is hingingly opened in the usual manner and the cover 15 and cover element 13, which are loosely mounted thereunder, are removed. A package of ice cream or other frozen comestible or other material to be refrigerated and illustrated at 18 is then placed in the container resting upon the bottom 12 and within the liner 7. The cover element 13 is then put in position and a small package of dry ice illustrated at 19 is laid upon the cover element 13. The cover 15 is then put in place and thereafter the upper walls 2 are folded in position and secured by adhesive or in any other suitable means in the usual manner.

In the operation of the container, it will be observed that there is no direct air communication between the compartment 16 and the compartment 17, such communication being closed off by the cover element 13 by overlapping at all points at least a portion of the upper end of the liner 7. Upper portions of the compartment 17 are therefore chilled by conduction through the cover element 13, and such conduction being relatively slow, there is no liability that the upper portion of the ice cream package 18 will be rendered too cold.

Air in the compartment 16, however, communicates downwardly through the recesses 14 through the ducts 10 formed by the corrugations out at the notches 11 into the lower part of the compartment 17, and the compartment is chilled by the air communication thus effected and taking place slowly, there being no direct circulation as will be understood from the foregoing description.

By this means, no part of the compartment 17 is colder than another and the ice cream in the package 18 may be maintained at a suitable temperature at all parts thereof over a long period of time.

The added insulation provided by the bottom 12 upon which the package 18 rests compensates for the direct contact therewith of the ice cream package.

The air within the compartment 17 may have a true circulation by convection; and the transfer of heat through the solid material of the cover element 13 directly from the compartment 17 takes place at approximately the same rate as the transfer of heat from the compartment 16 through the air over the relatively greater distance by way of the ducts 10; so that the entire interior of the compartment 17 will give up its heat at substantially the same rate and be maintained at substantially the same temperature.

It is one of the advantages of my invention that for a given size of compartment 17 and of compartment 16, and for a given quantity of dry ice 19, the temperature at which the compartment 17 will be maintained or the length of time at which it will be maintained at a predetermined temperature may be controlled by the height of the notches 11, or may be controlled by the length of the recesses 14 or by both concurrently. For example, with all other conditions the same, if the notches 11 are higher, the temperature in the compartment 17 will be maintained colder and vice versa; and if the recesses 14 are longer, other conditions being the same, the temperature in the compartment 17 will be colder and vice versa. And, while a change of length of the recesses 14 will change the temperature in the compartment 17, the temperature is more sensitively responsive to a change of height of the notches 11.

Thus, if it be desired to keep ice cream such as that in the package 18 for eight hours and at the end of that time have it at, say, 32° F., a liner may be employed having therein notches 11 of a corresponding height; but if at the end of that time it be desired to have the ice cream at a lower temperature, a liner 7 having higher notches may be employed. Or, with all other conditions the same, if the package is to be used in a warm climate, higher notches 11 would be employed than in a colder climate. A variation in the quantity of dry ice 19 employed has small effect upon the temperature in the compartment 17 with the above described construction, it only being necessary to provide enough dry ice to last for the length of time that it is desired to keep the package refrigerated.

As a further means of adjustably controlling the rate of refrigeration in the compartment 17, and which is particularly applicable to cases in which the container will be transported under high outside temperature conditions and therefore in which it is necessary to effect refrigeration at a high rate, the apparatus above described may be used as follows. The liner 7 may be telescoped into the container upsidedown with respect to the position illustrated whereby the notches 11 will form with the recesses 14 a communication directly from the upper or dry ice compartment 16 to the package compartment 17. By such an inter-communication, a rapid transfer of heat will occur. And here again, the rate of heat transfer may be predetermined and therefore adjustably varied by selecting a suitable liner 7 and a suitable partition 13 having large or small notches and recesses to provide a large or small inter-communicating passageway.

In all of the above described modes of operation of the elements comprising the refrigerating container embodying my invention, it is believed that refrigeration is effected by the carbondioxide gas of high specific gravity flowing downwardly from the dry ice and displacing the warmer and lighter air or warmed gas thereunder, expansion of the dry ice into gas being permitted by leakage outwardly through joints and crevices of the package.

Thus, in a manufactory sending out packages of ice cream in boxes as above described, a plurality of different liners 7 having notches 11 of different height or a plurality of covers having recesses 14 of different lengths may be kept in stock and at the time of shipping out the package a suitable liner or suitable partition 13 may be put into the box to correspond with the demands or requirements of the customer who is to receive the ice cream for consumption at a specified time.

Thus, my invention not only provides an improved refrigerating package, but provides one, the degree of refrigeration of which may be readily adjustably varied.

My invention is not limited to the exact details of construction shown and described. Changes and modifications may be made without departing from the spirit of my invention or sacrificing its advantages and within the scope of the appended claims.

I claim:

1. In a refrigerating container for ice cream and the like, a box-like enclosure comprising a closed chamber having walls of heat insulating material, a wall liner in the chamber having ducts extending therethrough terminating at points spaced from one end of the chamber and opening into the interior thereof, a transverse partition of low heat conducting material closing the chamber at the opposite end of the liner, and providing a closed compartment outside of the chamber for containing refrigerating material, and passageways effecting communication between the ducts and the interior of the compartment.

2. A refrigerating container as described in claim 1 and in which the said liner is composed of corrugated board material and the ducts are comprised by the corrugations.

3. In a refrigerating container for ice cream and the like, a box-like enclosure having walls of heat insulating material, a wall liner composed of corrugated board with the corrugations extending longitudinally of the chamber and one end of the liner resting upon an end wall of the chamber, the other end of the liner terminating inwardly of the opposite wall of the chamber, the liner at the first said end of the chamber having notches in its end providing communication between the corrugations and the chamber interior, a transverse partition of low heat conductivity resting upon the opposite end of the liner closing the chamber at that end and having openings at its periphery communicating with the opposite ends of said longitudinally extending corrugations, the partition providing a compartment adjacent one end of the container.

4. In a refrigerating container for ice cream and the like, a box-like enclosure comprising a chamber having walls of heat-insulating material, a partition in the chamber providing an upper refrigerant containing compartment and a lower compartment to be refrigerated, means providing ducts having heat insulated walls extending substantially vertically downwardly from the partition and opening into the lower compartment at a predetermined vertical distance from the bottom wall thereof, and the ducts at the upper ends opening into the upper compartment, the said vertical distance being proportioned to the predetermined desired refrigerated temperature of the lower compartment.

5. In a refrigerating container for ice cream and the like, a box-like enclosure comprising a chamber having walls of heat-insulating material, a partition in the chamber providing an upper refrigerant containing compartment and a lower compartment to be refrigerated, means providing ducts having heat insulated walls extending substantially vertically downward from the partition and opening into the lower compartment at a distance from the bottom wall thereof, the ducts at their upper ends opening into the upper compartment through passageways of predetermined cross-sectional area in lateral portions of the partition, the said area of the passageways being proportioned to the predetermined desired refrigerated temperature of the lower compartment.

6. In a refrigerating container for ice cream and the like, a box-like enclosure comprising a chamber having walls of heat-insulating material, a liner of heat-insulating material formed to be telescopable into the chamber, a partition in the chamber adapted to rest upon an upper portion of the liner to provide an upper refrigerant containing compartment and a lower compartment to be refrigerated within the liner, ducts extending substantially vertically downwardly from the partition through the liner and opening into the lower compartment through notches formed in the lower edge of the liner of predetermined vertical height, and the ducts at their upper ends opening into the compartment through lateral notches in the edge of the partition, and the partition being interchangeable with other partitions having notches of different area and the liner being interchangeable with other liners having notches of different height whereby the temperature maintained in the lower compartment may be adjustably controlled and varied.

7. In a refrigerating container for ice cream and the like, a box-like enclosure comprising a chamber having walls of heat-insulating material, a liner of heat-insulating material formed to be telescopable into the chamber, a partition in the chamber adapted to rest upon an upper portion of the liner to provide an upper refrigerant containing compartment and a lower compartment to be refrigerated within the liner, ducts extending substantially vertically downwardly from the partition through the liner and opening into the lower compartment through notches formed in the lower edge of the liner of predetermined vertical height, and the ducts at their upper ends opening into the compartment through lateral notches in the edge of the partition, and the liner being interchangeable with other liners having notches of different height whereby the temperature maintained in the lower compartment may be adjustably controlled and varied.

8. In a refrigerating container for ice cream and the like, a box-like enclosure comprising a chamber having walls of heat-insulating material, a liner of heat-insulating material formed to be telescopable into the chamber, a partition in the chamber adapted to rest upon an upper portion of the liner to provide an upper refrigerant containing compartment and a lower compartment to be refrigerated within the liner, ducts extending substantially vertically downwardly from the partition through the liner and opening into the lower compartment through notches formed in the lower edge of the liner of predetermined vertical height, and the ducts at their upper ends opening into the compartment through lateral notches in the edge of the partition, and the partition being interchangeable with other partitions having notches of different area whereby the temperature maintained in the lower compartment may be adjustably controlled and varied.

9. In a refrigerating container, a closed chamber having walls of heat-insulating material, a substantially vertically disposed liner of heat-insulating material therein spaced at its upper end from the upper end of the chamber and resting at its lower end on the chamber bottom wall, a transverse partition of heat-insulating material resting upon the upper end of the liner and dividing the chamber into a closed small upper compartment and a closed large lower compartment and adapted to support a package of dry ice thereon in the small compartment the liner having substantially vertically disposed ducts extending therethrough opening at lower ends into the lower compartment and at their upper ends terminating at the partition, the partition having recesses in its peripheral edges through which carbondioxide gas given off from the dry ice may flow downwardly through the ducts to the lower compartment.

10. A refrigerating container as described in claim 9 and in which substantially vertical ducts are provided in the wall of the liner and the recesses communicate with the upper ends of the ducts and the ducts open inwardly into the lower compartment at points remote from the partition.

11. In a refrigerating container, a closed chamber having walls of heat-insulating material, a substantially vertical liner of heat-insulating material loosely telescoped therein and spaced at its upper end from the upper end of the chamber and resting upon the bottom wall of the chamber, a transverse partition of heat-insulating material resting upon the upper end of the liner and dividing the chamber into a small closed upper compartment and a large closed lower compartment, and adapted to support a package of dry ice in the compartment, a plurality of passageways comprising recesses in peripheral portions of the partition and a plurality of notches in the upper end of the liner registering therewith, effecting communication from the small compartment to the upper portion of the large compartment.

ALMOND C. ROUTH.